United States Patent [19]

Kulischenko et al.

[11] 4,425,823

[45] Jan. 17, 1984

[54] MECHANISM FOR CONTROLLING REMOTELY DISPOSED INDUSTRIAL VALVES AND THE LIKE

[75] Inventors: Walter Kulischenko, East Brunswick, N.J.; Martin J. Capdevielle, Staten Island, N.Y.

[73] Assignee: Pennwalt Corporation, Philadelphia, Pa.

[21] Appl. No.: 297,394

[22] Filed: Aug. 28, 1981

[51] Int. Cl.³ .................. F16H 37/06; F16C 1/10; F16K 31/00

[52] U.S. Cl. .................. 74/665 GE; 74/665 G; 74/665 GD; 74/501 R; 464/179; 251/294; 137/595

[58] Field of Search .......... 74/501 R, 665 F, 665 G, 74/665 GB, 665 GE, 665 D; 251/248, 294; 464/51, 174, 179, 182, 158; 137/595

[56] References Cited

U.S. PATENT DOCUMENTS

| | | | |
|---|---|---|---|
| 1,460,096 | 6/1923 | Davis | 464/53 |
| 2,114,212 | 4/1938 | Christiansen | 74/501 |
| 2,368,457 | 1/1945 | Eisenbeis | 464/174 |
| 3,481,156 | 12/1969 | de Csipkes | 464/57 |
| 4,184,576 | 1/1980 | Kulischenko et al. | 464/37 |
| 4,185,474 | 1/1980 | Kulischenko | 464/57 |

FOREIGN PATENT DOCUMENTS 424118  8/1947  Italy .................. 74/665 G

Primary Examiner—Allan D. Herrmann
Assistant Examiner—Bruce F. Wojciechowski

[57] ABSTRACT

One or more remotely disposed valves may be opened or closed by a control handwheel by means of rotatable flexible shafting and mechanism associated therewith which may reduce the torque required to rotate the hand wheel and permitting much lighter weight and less costly flexible shafting to be employed. The associated mechanism comprises pulley-belt arrangements and/or gearing structures at each valve to be opened or closed as well as an optional pulley-belt arrangement cooperating with the handwheel. A torque limiting clutch device may readily be incorporated into the system for providing necessary slippage to the valve stems in the event one or more of the remotely disposed valves reaches the end of its travel prior to the remaining valves in the system.

14 Claims, 5 Drawing Figures

MECHANISM FOR CONTROLLING REMOTELY DISPOSED INDUSTRIAL VALVES AND THE LIKE

STATEMENT OF THE INVENTION

This invention relates to the remote controlling of remotely disposed industrial type valves and the like by means of a control handwheel or other means.

BACKGROUND AND SUMMARY OF THE INVENTION

Aboard ships, in nuclear and water treatment plants, in the treatment of wastewater effluents, and the like, it is often necessary that valves of varying sizes be continuously opened, closed, or controlled. Heretofore, such valves were manually or automatically operated, or opened or closed completely or partially from a remote control point. Large industrial valves, and shipboard valves, for example, are oftentimes controlled by a handwheel which controls the opening and closing of the remotely disposed or inaccessible valves by means of rotatable flexible shafts communicating therebetween. Considerable torque was usually required to rotate the handwheel. Further, the flexible shaft was proportionately large, heavy, and expensive.

As a typical example, a ¾" flexible shaft connected an inaccessible valve and the handwheel in a certain industrial plant. The flexible shaft was made by the assignee of the present invention and weighed approximately 114 lbs./100 feet. By substituting a ¼" flexible shaft for the ¾" shaft, in accordance with one aspect of the present invention, a savings of over 100 lbs./100 feet of shaft was realized as well as a very considerable savings in cost.

In the present invention, a handwheel may rotate a driver pulley which rotates a smaller driven pulley by means of a timing belt interconnecting the two. The spindle of the driven pulley rotates a flexible shaft which, in turn, may be connected to a step-down pulley-belt mechanism associated with the valve to be controlled. For smaller type valves, the pulley-belt arrangement at the handwheel may be eliminated.

In lieu of a step-down pulley-belt arrangement at the valve end, or in conjunction therewith, gearing structure, such as spiral gears, for example, comprising a pinion and a driven gear may be employed. The output spindle of the driven gear will cause the valve stem to be turned as desired, or, the output spindle may be connected to another step-down pulley-belt arrangement. In the former, the driven gear may be stepped down, i.e., the driven spiral gear will be provided with more spiral teeth than the pinion, thus reducing the torque necessary to turn the handwheel. A plurality of remotely disposed satellite valves may be serially connected for simultaneous opening or closing by a single handwheel and yet the flexible shafting connected between successive valves will oftentimes be lighter in weight and less costly than a single flexible shaft connected between a handwheel and a single valve.

To accommodate for differences in the number of turns required to open or close the various valves in the system, the invention incorporates torque-limiting devices to provide slippage of components to reduce the occurrence of any malfunctioning or overtorquing.

DETAILED DESCRIPTION OF THE INVENTION

Figure 1:
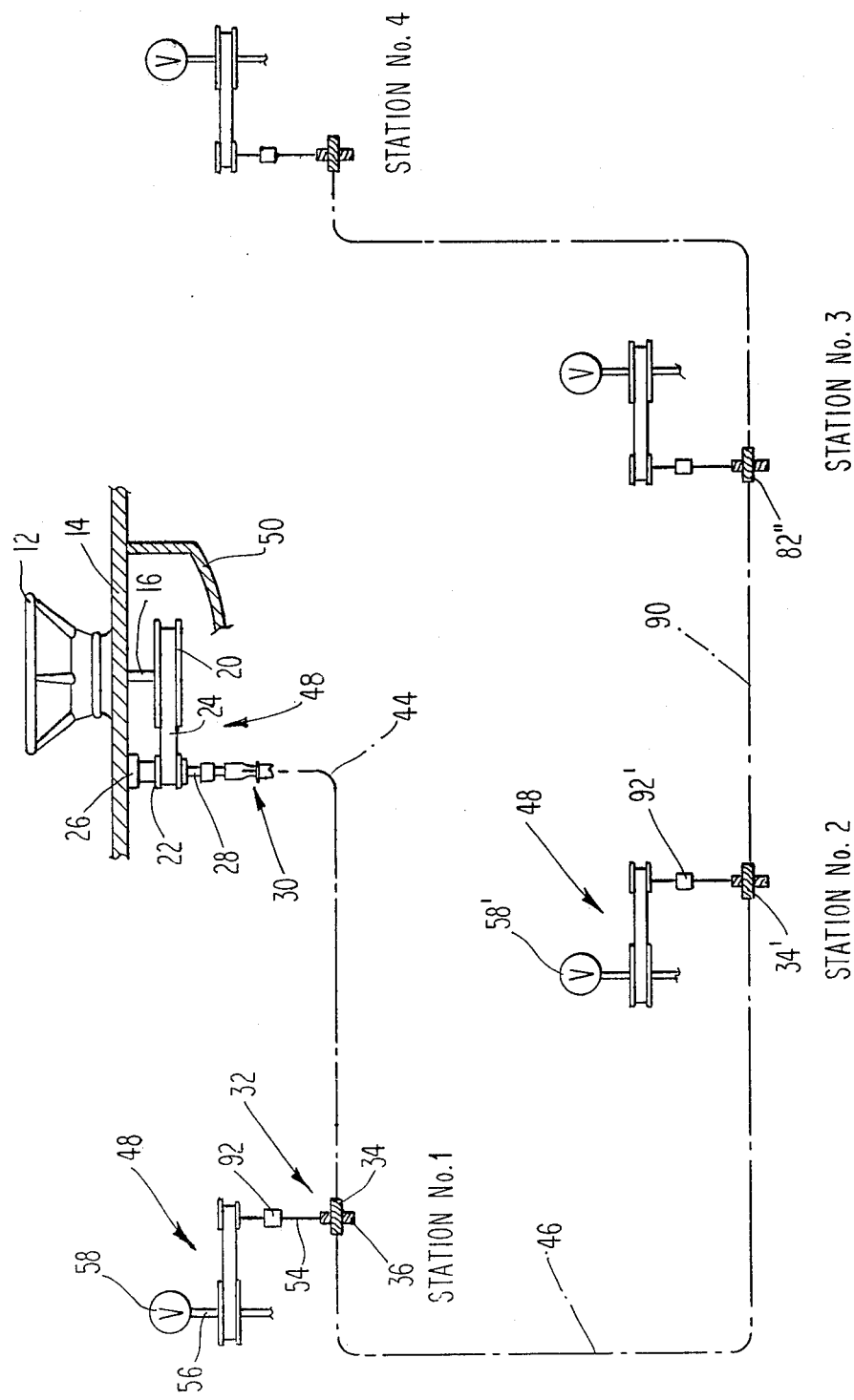
FIG. 1 is a diagrammatic illustration of an embodiment of mechanism for controlling remotely disposed valves in accordance with the present invention.

In FIG. 1, a handwheel 12 is mounted to a convenient support member 14. Shaft 16 of handwheel 12 is connected by conventional means to a driver pulley 20 such that one revolution of handwheel 12 produces one revolution of the driver pulley. Rotation of driver pulley 20 causes driven pulley 22 to rotate therewith by virtue of a timing belt 24 operably engaged therebetween. Driven pulley 22 is provided with a smaller diameter than driver pulley 20 and thus a single revolution of driver pulley 20 will produce multiple revolutions of the driven pulley. Typically, one complete revolution of hand wheel 12, or driver pulley 20, will cause driven pulley 22 to make about 5 revolutions. The ratio of diameters of the pulleys to achieve these values is readily calculable and is not stated herein.

Driven pulley 22 is journalled, or otherwise suitably rotatably mounted to support member 14 by pivot bearing 26, for example.

Figure 2:
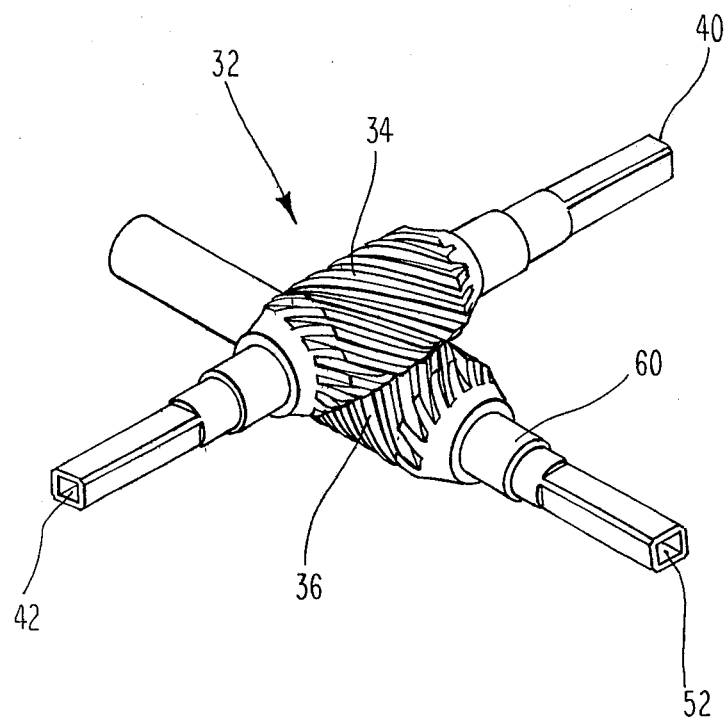
FIG. 2 is a perspective view, of spiral gears adapted to control a single, or plurality of remotely disposed valves.
Figure 3:
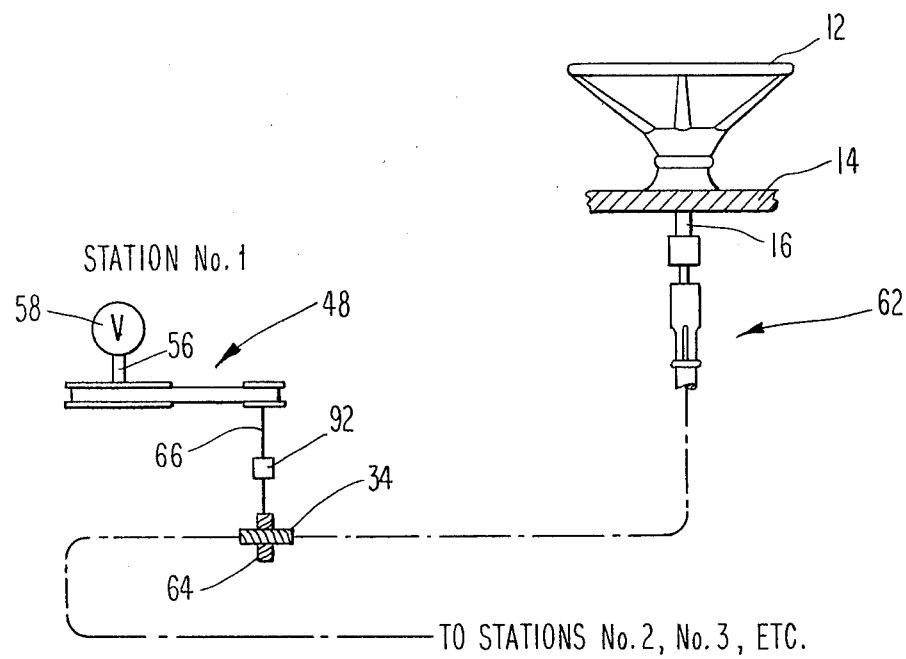
FIGS. 3 and 4 are diagrammatic illustrations, similar to FIG. 1, of modifications of the invention employing the spiral gears of FIG. 2.
Figure 4:
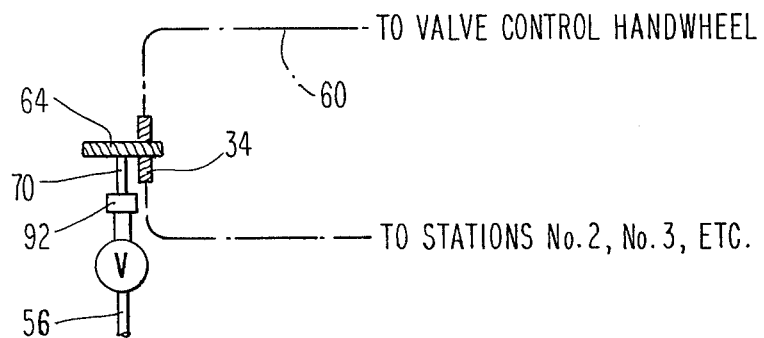

Shaft 28 of driven pulley 22 is connected to a conventional rotatable flexible shaft assembly 30 which transmits torque from shaft 28 to a spiral gear arrangement 32 comprising input pinion 34 and driven gear 36, illustrated in perspective in FIG. 2 and diagrammatically in FIGS. 1,2 and 4. In FIG. 1, pinion 34 and driven gear 36 comprise an equal number of spiral teeth and hence, one revolution of the pinion produces one revolution of the driven gear. In FIGS. 3 and 4 however, a single revolution of pinion 34 produces about a 120° rotation only of the driven gear.

Pinion 34 is provided with hollow squares 40 and 42 (FIG. 2) at opposite ends thereof for receiving conventional integrally formed squares (not shown) of rotatable flexible shafts. In FIG. 1, flexible shaft 44 is connected between flexible shaft assembly 30 and hollow square 42 at Station No. 1. Similarly, hollow square 40 receives integrally formed square of flexible shaft 46 interconnecting pinion 34 with pinion 34' of the spiral gear arrangement at Station No. 2.

All spiral gear arrangements are housed in conventional gear box housings (not shown). Pulley-belt arrangements 48 may also be enclosed in housings 50 as illustrated in FIG. 1.

Thus, flexible shaft 44 (FIG. 1), rotating with flexible shaft assembly 30, rotates pinion 34, driven gear 36, and flexible shaft 46. Driven gear 36 is also provided with a hollow square 52 (FIG. 2) for receiving an integrally formed square (not shown) of flexible shaft 54 which rotates pulley-belt arrangement 48 at Station No. 1 such that one revolution of handwheel 12 in either clockwise or counter clockwise direction produces one revolution of valve stem 56 of valve 58 in the same direction. The direction of pitch of the spiral gears determines the direction of rotation of shaft 60 of driven gear 36. Pitch direction, of course, is selected to rotate all valve stems 56 for each station in the same direction of rotation as handwheel 12.

In further clarification of one aspect of the invention, valve 58 at Station No. 1, for example, requires a certain pound-inch torque for opening and closing thereof. If the step-up ratio from the pulley-belt arrangement at the handwheel is similar to the step-down ratio of the pulley-belt arrangement at Station No. 1, as illustrated in FIG. 1, no torque advantage is gained solely from the respective pulley-belt arrangements. However, flexible shaft 44, as well as the remaining flexible shafts employed in the system, including the flexible shafts associated with Station No. 3 and Station No. 4, may be reduced in diameter resulting in a very considerable savings in flexible shaft weight and cost. Of course, by merely reversing driver pulley 20 and driven pulley 22 at the handwheel, a theoretical 25 to 1 torque advantage may be realized from the pulley-belt arrangements, assuming a 1 to 5 ratio of diameters of driver pulleys to driven pulleys, and disregarding handwheel diameter.

At Station No. 4 (FIG. 1), the input pinion may be provided with a hollow square at one end only since no through-put is required. The gear box housing will remain conventional.

In the modification of FIG. 3, the pulley-belt arrangement has been eliminated after the handwheel resulting in conventional flexible shaft assembly 62 rotating directly with the handwheel. The step-down advantage however is maintained through pinion 34 cooperating with a driven spiral gear 64, similar to driven gear 36 but having a greater number of spiral teeth than pinion 34 such that about 3 revolutions thereof produce 1 revolution of driven gear 64. Driven gear 64 rotates step-down pulley-belt arrangement 48 at Station No. 1. Driven gear 64 is provided with a hollow square (not shown) similar to hollow square 52 of driven gear 36 (FIG. 2) which receives a conventional formed square (not shown) of flexible shaft 66.

Thus, a theoretical 15 to 1 torque advantage (disregarding diameter of handwheel) is realized by the system illustrated in FIG. 3, i.e., a 3 to 1 step-down advantage from the spiral gear arrangement and a 5 to 1 step-down advantage from the pulley-belt arrangement.

In FIG. 4, flexible shaft 60 is connected to flexible shaft assembly 62 associated with the handwheel of FIG. 3. One revolution of flexible shaft 60 rotates pinion 34 one revolution which rotates spiral driven gear 64 one-third of a revolution. Driven gear 64 is secured to an extension 70 of valve stem 56. The ratio from the handwheel to any of the abovementioned valve stems may be 1:1 (FIG. 1), or 3:1 (FIG. 4), or 15 to 1 (FIG. 3). By merely reversing the driver and driven pulleys of FIG. 1, for example, and connecting flexible shaft 60 thereto, a 5 fold increase in ratio may be realized.

Figure 5:
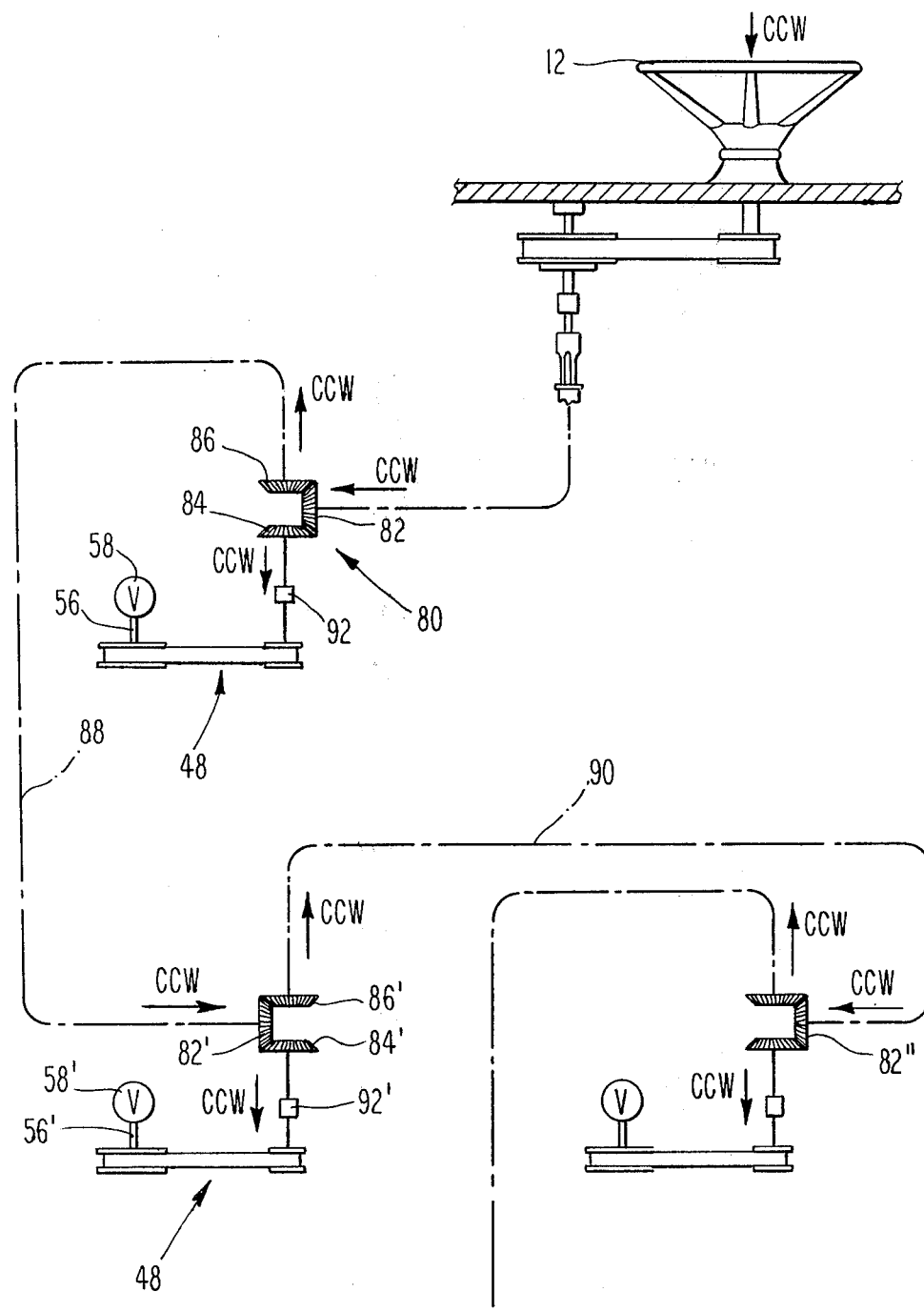
FIG. 5 is a diagrammatic illustration similar to FIGS. 1,3 and 4 showing a modification of the invention wherein bevel gearing is employed in lieu of the gearing of FIG. 2.

In the modification of FIG. 5, the driver and driven pulleys of FIG. 1 have been interchanged and spiral gear arrangement 32 replaced by a bevel gear T-coupler 80, each of the bevel gears having an equal number of teeth and being of identical size. Input bevel gear is designated 82 and the output gears 84 and 86. When handwheel 12 is rotated in a counterclockwise direction, for example, hereinafter referred to as CCW, when looking at the handwheel in the direction of the arrow pointing thereto, gear 82 will likewise rotate in a CCW direction. Similarly, gears 84 and 86 will rotate in a CCW direction when looking at the respective gears in the directions indicated by the arrows pointing away therefrom. Thus, 25 revolutions of handwheel 12 in one direction will rotate valve stem 56 one revolution in the same direction as well as all other valve stems downstream thereof. Flexible shaft 88 transmits torque from gear 86 to input gear 82' of the T-coupler immediately downstream thereof for rotating valve stem 56' in a CCW direction. Similarly, flexible shaft 90 transmits torque from output bevel gear 86' to input bevel gear 82'', and so forth. It is thus apparent from the drawing of FIG. 5, a CCW rotation of hand wheel 12 will produce a CCW rotation of all valve stems in the system. Conversely, a clockwise rotation of the hand wheel will cause the valve stems to rotate in a clockwise direction. The valve stems however will rotate about 1 revolution for each 25 revolutions of the handwheel regardless of direction of rotation of the handwheel, when the ratio of diameters of driven pulleys to driver pulleys is 5 to 1.

The invention is not intended to be limited to any specific ratio of revolutions of handwheel to valve stems. One skilled in the art may readily modify the ratio within, or combinations of, any of the arrangements of spiral gears, bevel gears, or pulley-belts to accommodate specific system applications. Normally, a 1 to 1 to 25 to 1 ratio of revolutions of the handwheel to valve stems will be employed while a maximum of about 4 to 6 satellite valves or stations will be controlled by a single handwheel.

Referring again to FIGS. 1, 3, 4 and 5, a torque-limiting clutch device 92 is positioned downstream the gear mechanism and serves to prevent malfunctioning of the system in the event a remotely disposed valve or valves opens or closes prior to the remaining valves in the system. Such a torque-limiting clutch device is shown and described in U.S. Pat. No. 4,184,576 for "Power Driven Flexible Shaft Clutch Assembly" of Kulischenko et al. The simple 3-component assembly is capable of rotating in either direction and may be used for power driven or remotely controlled applications. As stated in the patent, which is incorporated by reference herein, by merely varying the tenacity of the spring clip member, the clutch may be caused to "slip" when a specific torque loading is exceeded. The clutch assembly is adapted to receive a conventional integrally formed square of a flexible shaft at each end thereof. Integrally formed squares on rotatable flexible shafts are well known and are shown and described in several U.S. patents, for example, No. 4,185,474 of Kulischenko; No. 4,207,666 of Callahan; and No. 3,481,156 of de Csipkes, each assigned to the present assignee, as well as U.S. Pat. No. 4,184,576 incorporated herein. It is understood that other suitable means of connecting the flexible shafts to the spiral gears, bevel gears or pulley-belt arrangements in addition to the abovedescribed integrally formed squares with mating hollow squares may be employed, such as socket heads with set screws, fork fitting to mating tang, spline to pinion, fittings attached to ends of the shaft or casing, and the like.

The present invention contemplates the opening and closing of a single remotely disposed or inaccessible valve as well as a plurality of such valves. Thus, in the embodiment of FIG. 1, for example, flexible shaft 44 may be connected directly between flexible shaft assembly 30 and the torque-limiting clutch device 92, thereby eliminating the need for any intervening gear structure.

In the modification of FIG. 4, it is appreciated that valve stem extension 70 is severed in order that torque-limiting clutch device 92 may be utilized at the point of severance.

Well known electric clutch means cooperating with the torque-limiting clutch devices may readily disengage any satellite valve from the system.

It is apparent from the foregoing description that we have provided improved mechanism for opening and closing a single or plurality of remotely disposed valves or other like devices requiring controlled rotary motion to be imparted thereto. The improved mechanism permits flexible shafts of much less weight and cost to be employed while demanding no greater torque to turn the handwheel then heretofore required.

I claim:

1. Apparatus for imparting rotary motion to each of a plurality of remotely disposed devices comprising a plurality of remotely disposed valve stems capable of being rotated in either direction to open and close valves associated therewith, said apparatus comprising a handwheel remotely disposed from said devices, a first flexible shaft responsive to rotation of said handwheel and adapted to transmit torque therefrom to first of said plurality of devices, an additional flexible shaft connected between succeeding devices to thereby serially connect said first of said plurality of devices to last of said devices, each of said additional flexible shafts transmitting torque to a succeeding device from an immediate upstream device, and means cooperating with each of said flexible shafts for controlling said transmitted torque whereby rotation of said handwheel in one direction rotates each of said remotely disposed devices in same direction.

2. Apparatus of claim 1 wherein rotation of said handwheel for a specified number of revolutions rotates each of said plurality of remotely disposed valve stems an equal number of revolutions.

3. Apparatus of claim 1 wherein rotation of said hand wheel for a specified number of revolutions rotates each of said plurality of remotely disposed valve stems a lesser number of revolutions.

4. Apparatus of claim 3 wherein said means includes a pulley-belt arrangement associated with each of said devices, each of said pulley-belt arrangements comprising a driver pulley a driven pulley a timing belt interconnecting said driver and driven pulleys, each of said driven pulleys having a larger diameter than diameter of said driver pulley associated therewith, a driver pulley shaft of first of said pulley-belt arrangements adapted to rotate in response to rotation of said handwheel, output shaft of said driven pulley shaft of said first of said pulley-belt arrangements rotating said first flexible shaft, and gear means preceding each of said devices for transmitting torque applied thereto by its associated flexible shaft to be simultaneously conveyed (a) to a pulley-belt arrangement downstream thereof and (b) to similar gear means associated with a next succeeding device.

5. Apparatus of claim 4 wherein said gear means are spiral gears comprising a pinion and a driven gear.

6. Apparatus of claim 4 wherein said gear means is a T-coupling bevel gear arrangement.

7. Apparatus of claim 5 wherein said pinion and said driven gear comprise an equal number of teeth.

8. Apparatus of claim 5 wherein said driven gear comprises a greater number of teeth than said pinion to further reduce amount of torque required to rotate said handwheel.

9. Apparatus of claim 8 wherein said means includes a pulley-belt arrangement associated with each of said devices and comprising a driver pulley a driven pulley a timing belt interconnecting said driver and said driven pulleys, each of said driven pulleys having a larger diameter than diameter of said driver pulley associated therewith, and gear means preceding each of said devices for transmitting torque applied thereto by its associated flexible shaft to be simultaneously conveyed (a) to a pulley-belt arrangement downstream thereof and (b) to similar gear means associated with a next succeeding device.

10. Apparatus of claim 9 further characterized by said first flexible shaft rotating in direct response to rotation of said handwheel in a 1:1 ratio.

11. Apparatus of claim 8 wherein said driven gear of each spiral gear arrangement is secured directly to each of said valve stems to be rotated.

12. Apparatus of claim 4 wherein a torque-limiting clutch device is operably engaged between each of said pulley-belt arrangements associated with each of said remotely disposed devices and said gear means.

13. Apparatus of claim 11 wherein said valve stem is extended and severed, said driven gear being secured to outer of said severed portions and a torque-limiting clutch device operably engaged to said severed stem at point of severance downstream said driven gear.

14. Apparatus of claim 4 wherein said means also includes a pulley-belt arrangement associated with said handwheel and wherein said pulley-belt arrangement associated with said handwheel includes a driven pulley having a larger diameter than diameter of said driver pulley.

* * * * *